(12) United States Patent
Rozario et al.

(10) Patent No.: US 6,618,793 B2
(45) Date of Patent: Sep. 9, 2003

(54) FREE MEMORY MANAGER SCHEME AND CACHE

(75) Inventors: Ranjit J. Rozario, San Jose, CA (US); Ravikrishna Cherukuri, San Jose, CA (US)

(73) Assignee: Redback Networks, Inc., San Jose, CA (US)

( * ) Notice: Subject to any disclaimer, the term of this patent is extended or adjusted under 35 U.S.C. 154(b) by 0 days.

(21) Appl. No.: 09/740,670

(22) Filed: Dec. 18, 2000

(65) Prior Publication Data

US 2002/0078303 A1 Jun. 20, 2002

(51) Int. Cl.[7] .............................................. G06F 12/02
(52) U.S. Cl. ........................... 711/133; 711/3; 711/100; 711/118; 711/154
(58) Field of Search ............................. 711/3, 100, 118, 711/154, 156, 165, 170

(56) References Cited

U.S. PATENT DOCUMENTS

| 5,875,461 | A | * | 2/1999 | Lindholm | 711/118 |
| 6,026,452 | A | * | 2/2000 | Pitts | 710/56 |
| 6,026,475 | A | * | 2/2000 | Woodman | 711/202 |

* cited by examiner

*Primary Examiner*—Tuan V. Thai
(74) *Attorney, Agent, or Firm*—Morrison & Foerster LLP

(57) ABSTRACT

Free memory can be managed by creating a free list having entries with address of free memory location. A portion of this free list can then be cached in a cache that includes an upper threshold and a lower threshold. Additionally, a plurality of free lists are created for a plurality of memory banks in a plurality of memory channels. A free list is created for each memory bank in each memory channel. Entries from these free lists are written to a global cache. The entries written to the global cache are distributed between the memory channels and memory banks.

28 Claims, 5 Drawing Sheets

FREE MEMORY MANAGER SCHEME AND CACHE

BACKGROUND OF THE INVENTION

1. Field of the Invention

The present invention generally relates to managing free memory space and more particularly to managing multiple memory banks in multiple memory channels.

2. Description of the Related Art

In general, memory managers are utilized to manage the allocation and de-allocation of available memory space (i.e., free memory space) in a memory device, such as RAMs, DRAMs, and the like. More particularly, the addresses of free memory space are typically stored as entries on a free list, which is stored on the memory device. A conventional memory manager allocates and de-allocates free memory space in the memory device by reading and writing entries from the free list. A conventional memory manager also generally includes a buffering and/or caching system to copy the free list or a portion of the free list to a buffer and/or cache.

One conventional buffering/caching system for a memory manager is a ring buffer. In a ring buffer, the head (i.e., the highest address) and the end (i.e., the lowest address) of the buffer are linked together. A read pointer and a write pointer are typically used to read and write to the buffer from the head to the end of the buffer. When these pointers reach the end of the buffer, they are directed back to the head of the buffer.

One disadvantage of conventional memory managers, such as those that use a ringer buffer, is that the memory device is accessed each time entries are read or written from the buffer. This can reduce the speed and efficiency of the memory device as well as the hardware and/or software system accessing the memory device.

SUMMARY OF THE INVENTION

In accordance with one aspect of the present invention, free memory can be managed by creating a free list having entries with addresses of free memory location. A portion of this free list can then be cached in a cache that includes an upper threshold and a lower threshold.

In accordance with another aspect of the present invention, a plurality of free lists are created for a plurality of memory banks in a plurality of memory channels. A free list is created for each memory bank in each memory channel. Entries from these free lists are written to a global cache. The entries written to the global cache are distributed between the memory channels and memory banks.

DESCRIPTION OF THE DRAWING FIGURES

The present invention can be best understood by reference to the following description taken in conjunction with the accompanying drawing figures, in which like parts may be referred to by like numerals:

DETAILED DESCRIPTION OF EXEMPLARY EMBODIMENTS

In order to provide a more thorough understanding of the present invention, the following description sets forth numerous specific details, such as specific configurations, parameters, and the like. It should be recognized, however, that such description is not intended as a limitation on the scope of the present invention, but is intended to provide a better description of exemplary embodiments.

Figure 1:
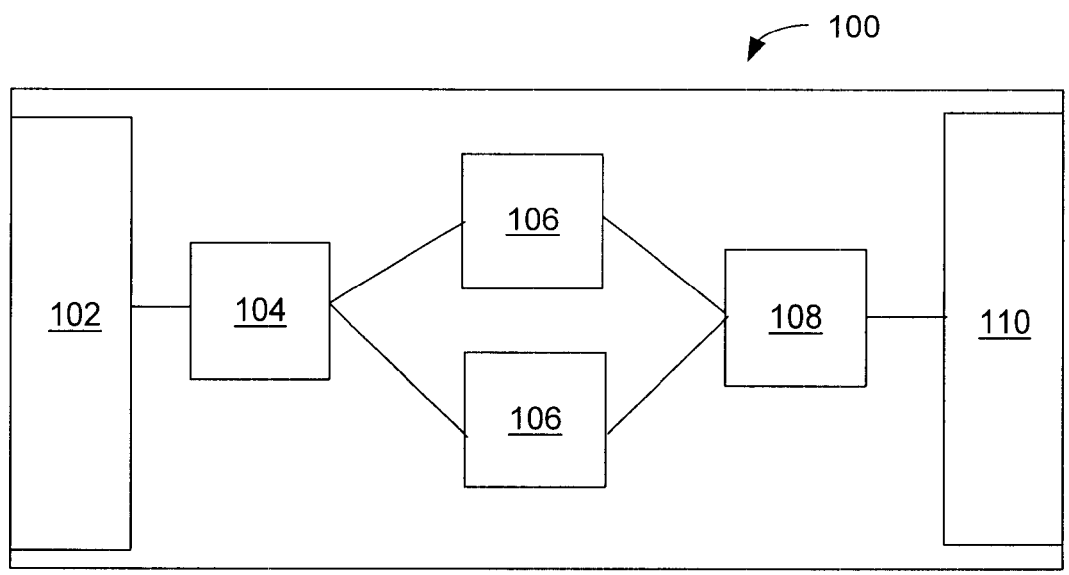
FIG. 1 is a block diagram of a line card.

With reference to FIG. 1, a line card 100 is depicted. In accordance with one aspect of the present invention, line card 100 can be connected to various framer devices. As such, line card 100 can receive and send various types of signals, such as circuit-switched signals, packet signals, and the like.

With continued reference to FIG. 1, line card 100 includes a line interface 102, a framer ASIC 104, packet processor ASICs (PPAs) 106, a packet mesh ASIC (PMA) 108, and a backplane interface 110. Line interface 102 can be configured to connect to any number of framer devices. Backplane interface 110 can be configured to connect to any number of additional line cards on a mesh, a common bus, and the like. As such, signals can be received from framer devices connected to line interface 102, then sent to other line cards through backplane interface 110. Additionally, signals from other line cards can be received through backplane interface 110, then sent to a framer device connected to line interface 102.

As described above, line card 100 can receive various types of signals. Line card 100 can also receive mixed signals, such as a mix signal of circuit-switched signals and packet signals. As such, line ASIC 104 can be configured to separate packet signals, then pass them onto PPAs 106 for processing.

As also described above, signals can be received from line interface 102 and sent out backplane interface 110. Additionally, signals can be received from backplane interface 110 and sent out line interface 102. As such, in the configuration depicted in FIG. 1, one PPA 106 can be configured as an egress PPA, which handles signals being sent out line interface 102, and the other PPA 106 can be configured as an ingress PPA, which handles signals being received from line interface 102. It should be recognized, however, that a single PPA 106 can be configured as both an egress and an ingress PPA. It should be further recognized that line card 100 can be configured with any number of PPAs 106 configured as any number of ingress and egress PPAs.

After a packet is processed by the ingress PPA 106, it can then be sent out on backplane interface 110 by PMA 108. When a packet is received on backplane interface 110, it can be forwarded by PMA 108 to the egress PPA 106. The packet is then processed and sent out through line interface 102. As noted above, a single PPA 106 can be used as both an ingress and an egress PPA.

Figure 2:
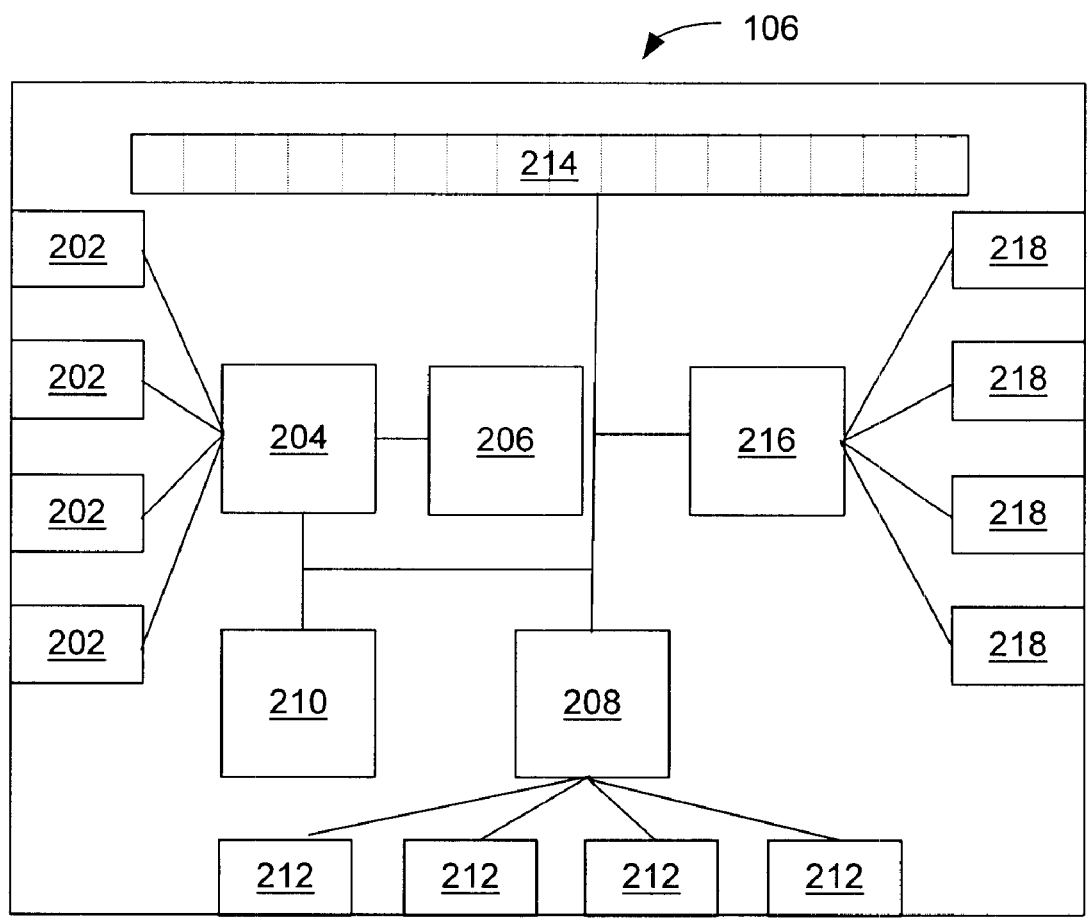
FIG. 2 is a block diagram of a packet processing ASIC (PPA)

With reference now to FIG. 2, PPA 106 is shown in greater detail. More particularly, PPA 106 includes LIP (Line Interface Protocol) interfaces 202, an input DMA 204, an input-descriptor queue 206, a memory controller 208, a Free Memory Manager (FMG) 210, memory channels 212, Execution Units (EUs) 214, an output DMA 216, and LIP interfaces 218.

As described earlier, PPA 106 is configured to process packet signals. More particularly, a packet is first received through LIP interface 202. Input DMA 204 is configured to create a descriptor of the received packet. This descriptor is then stored in input-descriptor queue 206. As will be described in greater detail below, input DMA 204 also obtains from FMG 210 the location of available space in memory (i.e., free memory), then stores the packet in memory. EUs 214 then access the stored packet using the descriptor stored in input-descriptor queue 206. The retrieved packet is then processed by EUs 214 in accordance with software instructions loaded on EUs 214. After the packet is processed, EUs 214 create an output descriptor for the packet. EUs 214 then write the output descriptor into a queue in output DMA 216. The packet is then sent out through LIP interface 218. For a more detailed description of output DMA 216 see U.S. patent application Ser. No. 09/740,669 entitled "Scheduler for a Data Memory Access Having Multiple Channels", filed on Dec. 18, 2000, the entire content of which is incorporated by reference.

As described above, LIP interfaces 202 can be configured to receive packets. In one embodiment of the present invention, LIP interfaces 202 operate at about 16 bits every 200 megahertz. Additionally, although four LIP interfaces 202 are depicted in FIG. 2, it should be recognized that PPA 106 can include any number of LIP interfaces 202 depending on the particular application.

As also described above, packets are stored in memory. It should be recognized, however, that various information (e.g., forwarding tables, the software program executed on EUs 214, and the like) can also be stored in memory.

As depicted in FIG. 2, in one exemplary embodiment of the present invention, PPA 106 includes four memory channels 212. Each memory channel 212 can be connected to any number of memory devices, which can be physically located on line card 100 (FIG. 1) but not directly on PPA 106. For example, in the present embodiment, each memory channel 212 is connected to a plurality of Dynamic Random Access Memories (DRAMs). More particularly, these DRAMS can include 100 megahertz DDR (Double Data Rate) SDRAMs (Synchronized DRAMs). It should be recognized, however, that various memory devices running at various speeds can be used.

In the present embodiment, PPA 106 can also include memory controller 208. Memory controller 208 can be configured to communicate with various blocks in PPA 106 (e.g., input DMA 204, FMG 210, EUs 214, output DMA 216, and the like) to provide access to memory. For the sake of clarity, in FIG. 2, memory controller 208 is depicted as a single block separate from memory channels 212. It should be recognized, however, that a separate memory controller 208 can be dedicated to each memory channel 212. Additionally, it should be recognized that memory controller 208 can be located within each memory channel 212.

In accordance with one aspect of the present invention, packets are stored in memory in 256-byte increments called Memory Data Units (MDUs). Additionally, in one embodiment, about 128 megabytes of memory are dedicated to storing MDUs, which is equivalent to about half a million MDUs. It should be recognized, however, that packets can be stored in any increments. It should be further recognized that any amount of memory space can be dedicated to storing packets.

As described above, when input DMA 204 receives a packet, it stores the packet in memory. More particularly, input DMA 204 obtains from FMG 210 free MDUs to store the packet in memory. Accordingly, FMG 210 is configured to keep track of which MDUs are free and which are being used. As described earlier, an MDU is 256-bytes long. If a packet is longer than 256-bytes, then input DMA 204 allocates the appropriate number of additional MDUs to store the packet. Input DMA 204 then creates a link list of MDUs.

As described above, input DMA 204 also creates a descriptor for each packet. Input DMA 204 then stores the descriptor in input-descriptor queue 206. In one embodiment of the present invention, the descriptor is about 64-bits (i.e., 8-bytes) long and includes fields such as location of the first MDU for the packet in memory, length of the packet, and the like. It should be recognized, however, that a descriptor can be any length and can include any number and type of fields.

As described above, EUs 214 retrieve the stored packet and process it. More particularly, EUs 214 read a descriptor out of input-descriptor queue 206. EUs 214 then retrieve the packet from memory using the descriptor. For example, EUs 214 can read the descriptor for a pointer to the first MDU containing the packet. EUs 214 can read the header of the packet, parse it, and classify the packet. EUs 214 can then modify certain fields of the packet before sending out the packet. In one embodiment of the present invention, EUs 214 include 16 Reduced Instruction Set Computer (RISC) processors. For a more detailed description of output EUs 214 see U.S. patent application Ser. No. 09/740,669, entitled "Cache Request Retry Queue", filed on Dec. 18, 2000, the entire content of which is incorporated by reference. It should be recognized, however, that EUs 214 can include any number and types of processors. Additionally, it should be recognized that EUs 214 can execute various software programs to process the packets in various manner.

As described above, when the packet is to be sent out, EUs 214 create an output descriptor, which can be based on the initial descriptor created for the packet. This output descriptor is written to a queue in output DMA 216, which then sends the packet out on LIP interfaces 218.

As described above, when a packet is received on LIP interfaces 202, input DMA 204 allocates free MDUs from FMG 210 to store the packet in memory channels 212. As also described above, when a packet is sent out on LIP interfaces 218, output DMA 216 de-allocates the used MDUs from FMG 210. Accordingly, FMG 210 is configured to track free and used MDUs in memory channels 212.

In the following description, input DMA 204 will be referred to as line-input block (LIN) 204. Additionally, output DMA 216 will be referred to as line-output block (LOP) 216. It should be recognized, however, that input DMA (LIN) 204 and output DMA (LOP) 216 can be referred to using any convenient term.

Figure 3:
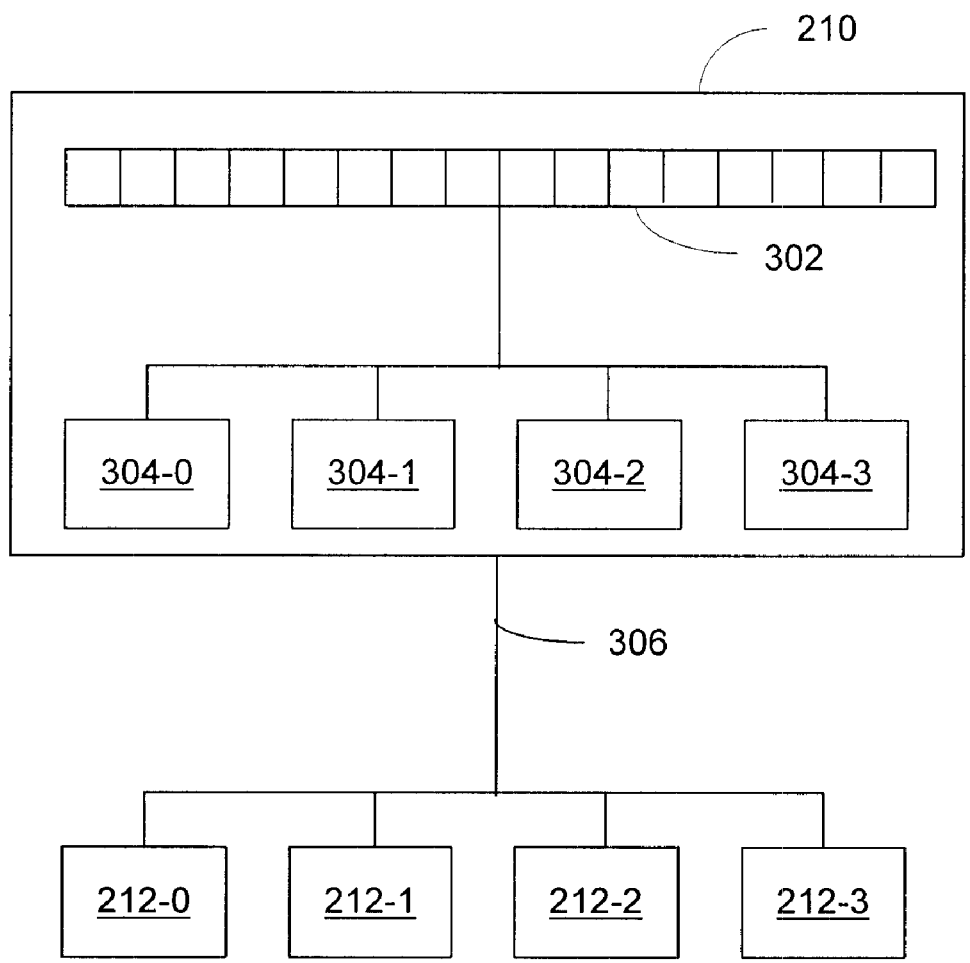
FIG. 3 is a block diagram of a portion of the PPA depicted in FIG. 2.

With reference now to FIG. 3, FMG 210 is shown in greater detail. In accordance with one exemplary embodiment of the present invention, FMG 210 includes a global cache 302 and a plurality of DRAM Channel Caches (DCCs) 304. More particularly, in the configuration depicted in FIG. 3, FMG 210 includes four DCCs 304 (i.e., 304-0, 304-1, 304-2, and 304-3). It should be recognized, however, that FMG 210 can include any number of DCCs 304.

As further depicted in FIG. 3, FMG 210 can be connected to memory channels 212 through a bus 306. It should be recognized, however, that FMG 210 can be connected to memory channels 212, either directly or indirectly, in any convenient manner.

In the present embodiment, DCCs 304 of FMG 210 are associated with memory channels 212. More particularly, DCC 304-0, 304-1, 304-2, and 304-3 are associated with memory channels 212-0, 212-1, 212-2, and 212-3, respectively. It should be recognized that DCCs 304 and channels 212 can be associated in any number of configurations.

Figure 4:
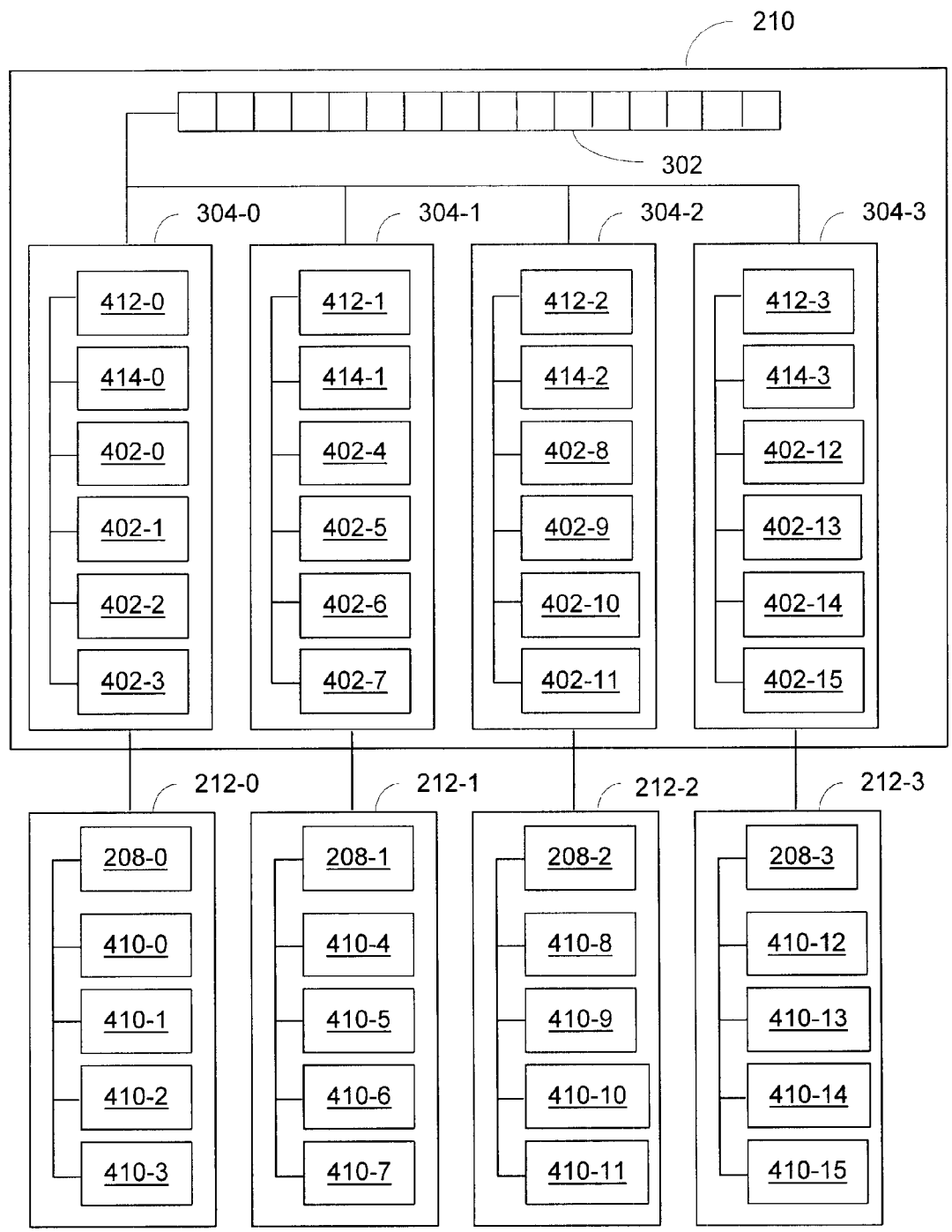
FIG. 4 is a more detailed block diagram of a portion of the PPA depicted in FIG. 2.

With reference now to FIG. 4, DCCs 304 are shown in greater detail. In accordance with one exemplary embodiment of the present invention, each DCC 304 includes a plurality of bank caches 402. In the configuration depicted in FIG. 4, each DCC 304 includes four bank caches 402. More particularly, DCC 304-0 includes bank caches 402-0 to 402-3. DCC 304-1 includes bank caches 402-4 to 402-7. DCC 304-2 includes bank caches 402-8 to 402-11. DCC 304-3 includes bank caches 402-12 to 402-15. It should be recognized, however, that DCCs 304 can include any number of bank caches 402.

With continued reference to FIG. 4, memory channels 212 are shown in greater detail. As described earlier, memory channels 212 can be connected to memory devices, such as RAMs, DRAMs, and the like. In one exemplary embodiment of the present invention, these memory devices are configured as four logical-memory banks 410 within each memory channel 212. More particularly, memory channel 212-0 includes memory banks 410-0 to 410-3. Memory channel 212-1 includes memory banks 410-4 to 410-7. Memory channel 212-2 includes memory banks 410-8 to 410-11. Memory channel 212-3 includes memory banks 410-12 to 410-15. It should be recognized, however, that memory channels 212 can include any number of memory banks 410.

As noted earlier, for the sake of convenience, in FIG. 2, memory controller 208 was depicted as a single block separate from memory channels 212. But it was noted earlier and as now depicted in FIG. 4, each memory channel 212 can include a separate memory controller 208. More particularly, memory channels 212-0, 212-1, 212-2, and 212-3 can include memory controllers 208-0, 208-1, 208-2, and 208-3, respectively. It should be recognized, however, that any number of memory controllers 208 can be associated with any number of memory channels 212.

As described earlier, DCCs 304 are associated with memory channels 212. In accordance with one aspect of the present invention, bank caches 402 in DCCs 304 are associated with memory banks 410 in memory channels 212. More particularly, bank caches 402-0 to 402-3 in DCC 304-0 are associated with memory banks 410-0 to 410-3 in memory channel 212-0, respectively. Bank caches 402-4 to 402-7 in DCC 304-1 are associated with memory banks 410-4 to 410-7 in memory channel 212-1, respectively. Bank caches 402-8 to 402-11 in DCC 304-2 are associated with memory banks 410-8 to 410-11 in memory channel 212-2, respectively. Bank caches 402-12 to 402-15 in DCC 304-3 are associated with memory banks 410-12 to 410-15 in memory channel 212-3, respectively. It should be recognized, however, that bank caches 402 can be associated with memory banks 410 in various configurations.

Figure 5:
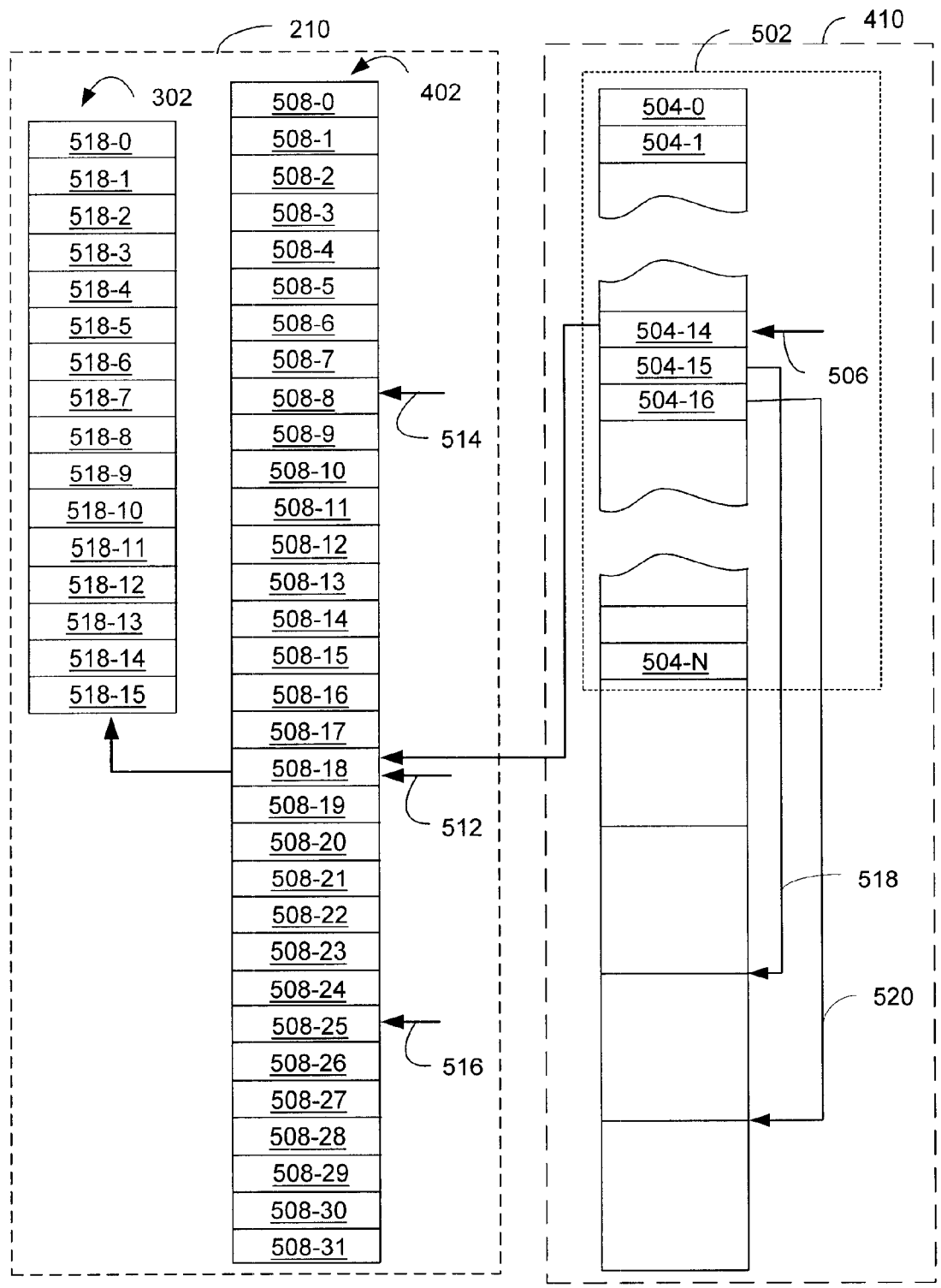
FIG. 5 is a block diagram of a free list, a cache, and a global cache.

As described earlier, in accordance with one aspect of the present invention, packets are stored in memory in 256-byte sized increments called MDUs. With reference now to FIG. 5, packets are stored as MDUs at memory addresses within each memory bank 410. As depicted in FIG. 5, each memory bank 410 includes a free list 502 that includes entries 504. In one exemplary embodiment, each entry 504 is 32 bits and is configured as a pointer to an address in memory bank 410. For example, assume that entries 504-15 and 504-16 point at memory addresses 518 and 520, respectively, in memory bank 410. As alluded to earlier, memory addresses 518 and 520 are 256-bytes apart to define an MDU. Accordingly, if memory address 518 is 300 hex, then address 520 is 400 hex.

As alluded to earlier, when PPA 106 (FIG. 2) is initialized and/or configured, the amount of memory to be dedicated to storing packets can be determined. At this time, free list 502 can be created by the software program running on EUs 214 (FIG. 2).

As described above, each entry 504 in free list 502 points to an MDU. As such, a free MDU can be allocated by writing an entry 504 as an entry 508 in bank cache 402 in DCC 304 (FIG. 4), which is then written as an entry 518 in global cache 302 in FMG 210. This entry can then be allocated by FMG 210 as a free MDU.

In accordance with one aspect of the present invention, free MDUs are allocated using a stack-based caching scheme. More particularly, as depicted in FIG. 5, each bank cache 402 can be configured as a stack of entries 508. In one exemplary embodiment, bank cache 402 includes 32 entries 508 (i.e., entries 508-0 to 508-31). Each entry 508 are 32-bits wide. It should be recognized, however, that bank cache 402 can include any number of entries and each entry can be any number of bits wide.

Assume for the sake of example that entry 508-0 defines the top and entry 508-31 defines the bottom of bank cache 402. As entries 504 are written from free list 508 as entries 508 in bank cache 402, they are written from bottom to the top of bank cache 402. As entries 508 are written, a bank-cache pointer 512 ascends up bank cache 402. Also assume that as entries 504 are read from free list 502, a free-list pointer 506 descends down free list 502 from entry 504-0 toward 504-N. Accordingly, when an entry is written from free list 508 into bank cache 402, free-list pointer 506 descends one entry in free list 502 and bank-cache pointer 512 ascends one entry in bank cache 402. For example, if entry 504-14 is written to entry 508-18, then free-list pointer 506 descends to entry 504-15 and bank-cache pointer 512 ascends to entry 508-17. It should be recognized, however, that entries 504 and 508 can be written and read in any direction.

As depicted in FIG. 5, global cache 302 includes 16 entries 518 (i.e., entries 518-0 to 518-15). Also, in the present embodiment, each entry 518 is 32-bits wide. It should be recognized, however, that global cache 302 can include any number of entries and each entry can be any number of bits wide.

Assume for the sake of example that entry 518-0 defines the top and entry 518-15 defines the bottom of global cache 302. In the present embodiment, entries 518 are read from the top and written to the bottom of global cache 302. For example, assume that entry 518-0 has been read from global cache 302, meaning that a free MDU has been allocated by FMG 210. Entry 508-18 can then be read from bank cache 402 and written to entry 518-15 in global cache 302. It should be recognized, however, that entries 518 can be written and read in any direction.

As depicted in FIG. 5, bank cache 402 includes a lower threshold 516. As entries 508 are read from bank cache 402 and written to global cache 302, bank-cache pointer 512 descends bank cache 402. As such, entries 508 are read from the current top of bank cache 402. When pointer 512 reaches lower threshold 516, then a block of entries are read from free list 502 and written to bank cache 402. In the present embodiment, lower threshold 516 can be set equal to the number of entries in the block that is read from free list 502 and written to bank cache 402 when lower threshold 516 is reached less one entry. For example, when lower threshold 516 is reached, a block of 8 valid entries can be read from free list 502 and written to bank cache 402. As such, in this example, lower threshold 516 can be set equal to 7 valid entries. It should be recognized, however, that the number of entries in the block read from free list 502 and written to bank cache 402 can vary depending on the particularly application. Additionally, lower threshold 515 can be set equal to any number of entries.

As described earlier, FMG 210 keeps track of MDUs that are de-allocated. With reference to FIG. 2, MDUs are de-allocated by LOP 216 after sending out a packet or a portion of a packet on LIP interfaces 218. More particularly, LOP 216 communicates with memory controller 208 and the de-allocated MDU is marked "modified" or "dirty". With reference now to FIG. 5, the address associated with the de-allocated MDU is written back to bank cache 402. As described earlier, entries are written to the current top of bank cache 402. For example, as depicted in FIG. 5, bank-cache pointer 512 indicates the current top of bank cache 402. As such, in the configuration depicted in FIG. 5, a new entry is written to entry 508-18, then bank-cache pointer 512 ascends to entry 508-17.

As further depicted in FIG. 5, bank cache 402 includes an upper threshold 514. When bank-cache 512 reaches upper threshold 514, a block of entries are read from bank cache 402 and written to free list 502. In the present embodiment, upper threshold 514 can be set equal to the maximum number of entries in bank cache 402 less the number of entries in the block that is read at one time from bank cache 402 and written to free list 502. For example, when upper threshold 514 is reached, a block of 8 entries can be read from bank cache 402 and written to free list 502. As such, in this example, upper threshold 514 can be set equal to 24 entries. It should be recognized that the number of entries in the block read from bank cache 402 and written to free list 502 can vary depending on the particularly application. Additionally, upper threshold 514 can be set equal to any number of entries.

In accordance with one aspect of the present invention, with reference to FIG. 4, logic block 414 in bank cache 304 is configured to keep track of the status of the entries (valid, modified, dirty, and the like) and their age. More particularly, in the present embodiment, each bank cache (i.e., bank cache 304-0 to 304-3) can be configured with a logic block 414 (i.e., logic blocks 414-0 to 414-3). With reference to FIG. 5, when upper threshold 514 is reached, a block of the oldest modified or dirty entries are read from bank cache 402 and written to free list 502. For example, upper threshold 514 can be set at 24 modified or dirty entries. As such, when there are 24 or more modified or dirty entries in bank cache 502, eight of the oldest modified or dirty entries can be written to free list 502.

By using this stack-based caching scheme, accessing of memory bank 410 can be reduced. In fact, when the allocation and de-allocation of MDUs reaches a steady state (i.e., the number of allocations and de-allocations stays within the bounds defined by upper threshold 514 and lower threshold 516), accessing of memory bank 410 can be reduce and may even be eliminated. This can increase the speed and efficiency of PPA 106 (FIG. 2).

In FIG. 5, a single data cache 402 and memory bank 410 is depicted. It should be recognized, however, that each data cache 402 in DCCs 304 (FIG. 4) and each memory bank 410 (FIG. 4) can utilize the stack-based caching scheme described above and depicted in FIG. 5.

Thus, with reference to FIG. 4, each data cache 402 (i.e., 402-0 to 402-15) write to global cache 302. More particularly, each DCC 304 includes a read block 412 (i.e., 412-0, 412-1, 412-2, and 412-3) that writes to global cache 302.

Additionally, in accordance with one aspect of the present invention, entries written to global cache 302 are distributed between DCCs 304 and between bank caches 402 within each DCC 304. As such, the allocation of MDUs is distributed between memory channels 212 and between memory banks 410 within each memory channel 212.

For example, assume that entries 518-0 to 518-15 (FIG. 5) are distributed between DCCs 304 and between bank caches 402 in the following manner. Entry 518-0 (FIG. 5) was read from bank cache 402-0 from DCC 304-0. Entry 518-1 (FIG. 5) was read from bank cache 402-4 from DCC 304-1. Entry 518-2 (FIG. 5) was read from bank cache 402-8 from DCC 304-2. Entry 518-3 (FIG. 5) was read from bank cache 402-12 from DCC 304-3. Entry 518-4 (FIG. 5) was read from bank cache 402-1 from DCC 304-0. Entry 518-5 was read from bank cache 402-5 from DCC 304-1. Entry 518-6 (FIG. 5) was read from bank cache 402-9 from DCC 304-2. Entry 518-7 (FIG. 5) was read from bank cache 402-13 from DCC 304-3. Entry 518-8 (FIG. 5) was read from bank cache 402-2 from DCC 304-0. Entry 518-9 (FIG. 5) was read from bank cache 402-6 from DCC 304-1. Entry 518-10 (FIG. 5) was read from bank cache 402-10 from DCC 304-2. Entry 518-11 (FIG. 5) was read from bank cache 402-14 from DCC 304-3. Entry 518-12 (FIG. 5) was read from bank cache 402-3 from DCC 304-0. Entry 518-13 (FIG. 5) was read from bank cache 402-7 from DCC 304-1. Entry 518-14 (FIG. 5) was read from bank cache 402-11 from DCC 304-2. Entry 518-15 (FIG. 5) was read from bank cache 402-15 from DCC 304-3.

In this manner, the reduction in access time to memory banks 410 associated with consecutively accessing the same memory bank 410 within too short a period of time can be reduced. This again can help increase the speed and efficiency of PPA 106 (FIG. 2). Although the distribution of entries in global cache 302 was sequential in the above example, it should be recognized that various distribution scheme can be utilized. Additionally, if there are no available free MDUs in a particular memory bank 410, then the dank cache 402 associated with that memory bank 410 can be skipped.

With reference now to FIG. 2, thus far, MDUs have been described as being allocated to LIN 204. It should be recognized, however, that other components of PPA 106 can use MDUs. For example, EUs 214 can create packets, such as control packets. EUs 214 can then request MDUs from FMG 210 to store these packets in memory.

With reference to FIG. 5, free list 502 was described as containing addresses for MDUs in memory bank 410 (FIG. 4). As described above, an MDU is 256 bytes in length. In accordance with one aspect of the present invention, MDUs are also 256-byte aligned such that their addresses are divisible by hex 100. As such, an MDU can be stored at an address hex 100, 200, 300, 400, and the like. But an MDU can not be stored at an address hex 150. Accordingly, the last eight bits of an MDU address (i.e., entries 504 in free list 502) are zeros. As such, in one exemplary embodiment, these last eight bits are replaced with a magic pattern, such as a hex A5. In this manner, free file 502 can be verified by looking for this magic pattern.

Although the present invention has been described in conjunction with particular embodiments illustrated in the appended drawing figures, various modifications can be made without departing from the spirit and scope of the present invention. Therefore, the present invention should not be construed as limited to the specific forms shown in the drawings and described above.

We claim:
1. A method of managing free memory, said method comprising:
   creating a free list having entries with addresses of free memory locations; and
   caching a portion of said free list in a cache having entries with addresses of free memory locations, wherein said cache includes a first threshold and a second threshold, wherein said entries in said cache include valid entries and modified entries, and wherein said caching step further comprises:
      reading a block of entries from said free list to said cache when the number of valid entries in said cache reaches said first threshold: and
      writing a block of entries from said cache to said free list when the number of modified entries in said cache reaches said second threshold.
2. The method of claim 1, wherein said first threshold is set equal to the number of entries in said block of entries read from said free list to said cache less one entry.
3. The method of claim 2, wherein said first threshold is set at 7 entries.
4. The method of claim 1, wherein said second threshold is set equal to the maximum number of entries in said cache less the number of entries in said block of entries written from said cache to said free list.
5. The method of claim 4, wherein said second threshold is set at 24 entries.
6. The method of claim 1 further comprising the step of writing a magic pattern to each entry in said free list.
7. The method of claim 6, wherein said magic pattern is written to the last 8 bits of each entry in said free list.
8. The method of claim 1 further comprising the step of writing entries from said cache to a global cache.
9. The method of claim 8, further comprising:
   writing entries from a plurality of caches to said global cache, wherein said plurality of caches arc associated with a plurality of memory banks in a plurality of memory channels.
10. The method of claim 9, wherein said entries written to said global cache are distributed between said memory banks end said memory channels.
11. A method of managing free memory in a memory system having a plurality of memory banks in a plurality of memory channels, said method comprising:
   creating a plurality of free lists having entries with addresses of free memory locations, wherein a free list is created for each memory bank in each memory channel; and
   writing entries from said free lists to a global cache, wherein said entries are written to said global cache are distributed between memory channels and memory banks,further comprising:
      writing entries from a first free list to said global cache, wherein said first free list is associated with a first memory bank in a first memory channel;
      writing entries from a second free list to said global cache, wherein said second free lint is associated with a second memory bank in a second memory channel;
      writing entries from a third free lint to said global cache, wherein said third free list is associated with a third memory bank in said first memory channel; and
      writing entries from a fourth free list to said global cache, wherein said fourth free list is associated with a fourth memory bank in said second memory channel.
12. The method of claim 11, wherein said entries written from said free lists to said global cache are written sequentially between memory channels and memory banks.
13. The method of claim 11, wherein an entry is written from said first free list to said global cache, then an entry is written from said second free list to said global cache, then an entry is written from said third free list to said global cache, then an entry is written from said fourth free list to said global cache.
14. The method of claim 11, further comprising:
   caching portions of said free lists in a plurality of caches before writing said entries to global cache,
   wherein each cache is associated with a memory bank in each memory channel.
15. The method of claim 14, wherein each cache includes an upper threshold and a lower threshold.
16. The method of claim 15, wherein each cache includes valid entries and
   modified entries, and wherein said caching step further comprises:
      reading a block of entries from a free list to said cache when the number of valid entries in said cache reaches said lower Threshold; and
   writing a block of entries from said cache to said free list when the number of modified entries in said cache reaches said upper threshold.
17. The method of claim 16, wherein said lower threshold is set equal to the number of entries in said block of entries read from said free list to said cache less one entry, and wherein said upper threshold is set equal to the maximum number of entries in said cache less The number of entries in said block of entries written from said cache to said free list.
18. A method of managing free memory, said method comprising:
   creating a free list having entries with addresses of free memory locations;
   caching a portion of said free list in a cache having an upper threshold and a lower threshold;
   reading a block of entries from said free to said cache when the number of valid entries in said cache reaches said lower threshold; and
   writing a block of entries from said cache to said free list when the number of modified entries in said cache reaches said upper threshold.
19. The method of claim 18, wherein said lower threshold is set equal to the number of entries in said block of entries read from said free list to said cache less one entry, and wherein said upper threshold is set equal to the maximum number of entries in said cache less the number of entries in said block of entries written from said cache to said free list.
20. A method of managing free memory, said method comprising:
   creating a plurality of free lists having entries with addresses of free memory locations, wherein said free lists are associated with a plurality of memory banks in a plurality of memory channels;
   writing entries from said free lists to a plurality of caches; and
   writing entries from said caches to a global cache, wherein said entries written to said global cache are distributed between said memory channels and said memory banks, further comprising:
      writing entries from a first free list to said global cache, wherein said first free list is associated with a first memory bank in a first memory channel; and writing entries from a second free list to said global cache, wherein said second free list is associated with a second memory bank in a second memory channel.

21. The method of claim 20, wherein said entries from said caches are written to said global cache sequentially between said memory channels and said memory banks.

22. A system for managing free memory comprising:

a free list having entries with addresses of free memory locations; and a cache configured to receive a portion of said free list, wherein said cache includes a first threshold and a second threshold, wherein said cache includes valid entries and modified entries, wherein said cache is configured to read a block of entries from said free list to said cache when the number of valid entries in said cache reaches said first threshold, and wherein said cache is configured to write a block of entries said free list when the number of modified entries in said cache reaches said second threshold.

23. The system of claim 22, wherein said first threshold is equal to the number of entries in said block of entries read from said free list to said cache less one entry.

24. The system of claim 22, wherein said second threshold is equal to the maximum number of entries in said cache less the number of entries in said block of entries written from said cache to said free list.

25. The system of claim 22, wherein each entry in said free list includes a magic pattern.

26. The system of claim 22, further comprising a global cache configured to receive entries from said cache.

27. The system of claim 26, further comprising a plurality of caches connected to said global cache, wherein said plurality of caches are connected to a plurality of memory banks in a plurality of memory channels.

28. The system of claim 27, wherein said global cache is configured to receive entries distributed between said plurality of caches.

* * * * *